United States Patent

Harskamp et al.

[11] Patent Number: 6,016,138
[45] Date of Patent: Jan. 18, 2000

[54] GEL MOUSE

[76] Inventors: Lisa Harskamp, 1654 Kains St., Berkeley, Calif. 94702; Ali Mahrouyan, 21481 Elm Ct., Cupertino, Calif. 95014; Steve Jacobsen, 34559 Vane Common, Freemont, Calif. 94555

[21] Appl. No.: 08/949,691

[22] Filed: Oct. 14, 1997

[51] Int. Cl.[7] ........................ G09G 5/08
[52] U.S. Cl. ........................ 345/163; 248/118
[58] Field of Search ............... 345/156–169; 248/118

[56] References Cited

U.S. PATENT DOCUMENTS

| | | | |
|---|---|---|---|
| 5,570,112 | 10/1996 | Robinson | 345/156 |
| 5,731,807 | 3/1998 | Feierbach | 345/163 |
| 5,765,795 | 6/1998 | Alex | 248/346.1 |
| 5,820,968 | 10/1998 | Kurani | 428/137 |

*Primary Examiner*—Richard A. Hjerpe
*Assistant Examiner*—Anthony J. Blackman

[57] ABSTRACT

A mouse for use in association with a computer is disclosed. The mouse comprises a housing having a lower surface and an upper surface with side walls therebetween to define a lower chamber therewithin. The housing includes a peripheral extension wall extending upwardly from the periphery of the housing as an extension of the side walls to define an upper recessed cavity. A membrane having a periphery secured to the upper regions of the extension wall forms the top surface of a primary chamber. The membrane is fabricated of a deformable resilient elastomeric material. A quantity of gel-like fluid within the primary chamber is adapted to change shape of the housing membrane from an initial shape to a custom fit shape conforming substantially with the anatomical contours of a user's hand for enhanced comfort and reduced fatigue during use of the computer mouse, the gel-like fluid retaining the custom fit shape for a substantial period of time following release of the use of the computer mouse and thereafter returning substantially to the initial shape.

3 Claims, 2 Drawing Sheets

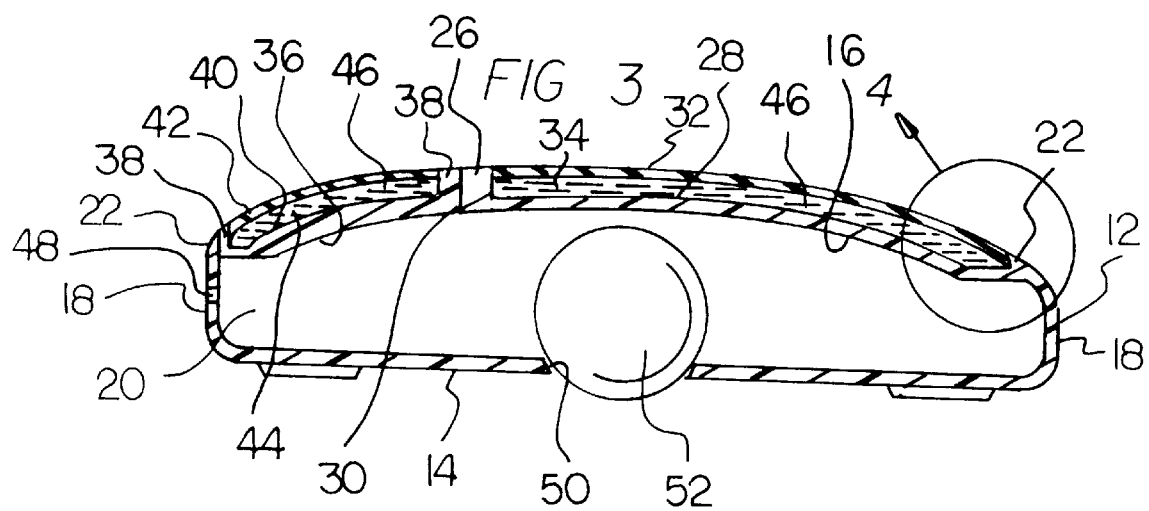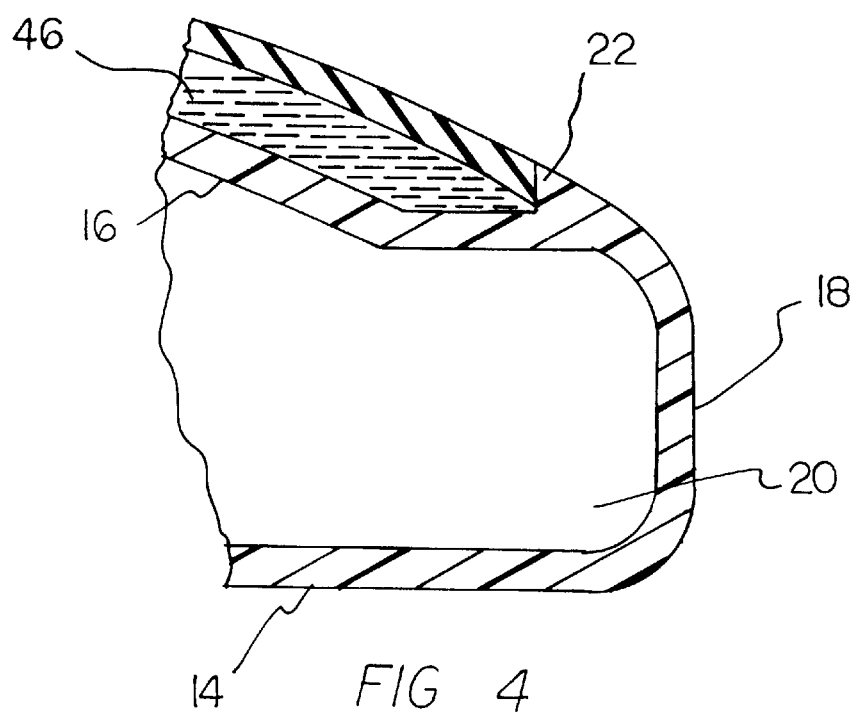

GEL MOUSE

BACKGROUND OF THE INVENTION

1. Field of the Invention

The present invention relates to a new and improved gel mouse and, more particularly, pertains to utilizing a gel-like fluid in a computer mouse for creating an ergonomic computer mouse for generating commands by a user of a computer.

2. Description of the Prior Art

The use of mouse-like devices having rigid housings is well known in the prior art. More specifically, mouse-like devices employing rigid housings heretofore devised and utilized for the purpose of generating commands to a computer are known to consist basically of familiar, expected, and obvious structural configurations, notwithstanding the myriad of designs encompassed by the crowded prior art which has been developed for the fulfillment of countless objectives and requirements.

The prior art discloses a number of mouse-like devices employing conventional housings for generating commands to a computer. By way of example, U.S. Pat. No. 5,576,733 to Lo, issued Nov. 19, 1996, discloses an ergonomic computer mouse including an upright, primary finger-supporting surface for supporting all the fingers of an upright hand in straight positions and in an upright stack. Further, U.S. Pat. No. 5,570,112 to Robinson, issued Oct. 29, 1996, discloses an ergonomic computer mouse with a soft foam rubber structure built into the housing for supporting a wrist and palm of a computer operator in a spring-like manner.

In this respect, the gel mouse according to the present invention substantially departs from the conventional concepts and designs of the prior art, and in doing so provides an apparatus primarily developed for the purpose of utilizing a gel-like fluid in a computer mouse for changing the shape of the housing from an initial shape to a custom fit shape conforming substantially with the anatomical contours of a user's hand for enhanced comfort and reduced fatigue during use of the computer mouse whereby the gel-like fluid retains the custom fit shape for a substantial period of time following release of said use of the computer mouse and thereafter returning substantially to said initial shape.

Therefore, it can be appreciated that there exists a continuing need for a new and improved gel mouse which can be used for utilizing a gel-like fluid in a computer mouse for generating commands by a user to a computer. In this regard, the present invention substantially fulfills this need.

SUMMARY OF THE INVENTION

In view of the foregoing disadvantages inherent in the known types of mouse-like devices for generating commands to a computer now present in the prior art, the present invention provides a new and improved gel mouse. As such, the general purpose of the present invention, which will be described subsequently in greater detail, is to provide a new and improved gel mouse and methods which have all the advantages of the prior art and none of the disadvantages.

To attain this, the present invention essentially comprises a new and improved gel mouse for use in association with a computer comprising, in combination, a unitary main housing fabricated of a rigid plastic material and having a flat lower surface and a generally spherical upper surface with side walls therebetween to define a lower chamber therewithin, the housing including a peripheral extension wall extending upwardly from the periphery of the housing as an extension of the side walls with a supplemental extension wall within the peripheral extension wall to define a large upper primary recessed cavity and a button receiving opening; a large membrane having a periphery secured to the upper regions of the peripheral and supplemental extension wall and forming the top surface of an upper primary chamber; a pair of buttons, each button including a peripheral extension wall to define a secondary recessed cavity; a pair of button membranes, each button membrane having a periphery secured to the upper regions of one of the button peripheral extension walls and forming the top surfaces of a pair of secondary chambers; a quantity of gel-like fluid within the primary chamber and adapted to change shape of the housing membrane from an initial shape to a custom fit shape conforming substantially with the anatomical contours of a user's palm for enhanced comfort and reduced fatigue during use of the computer mouse, said gel-like fluid retaining said custom fit shape for a substantial period of time following release of said use of the computer mouse and thereafter returning substantially to said initial shape; and a quantity of gel-like fluid within the secondary adapted to change shape of the button membrane from an initial shape to a custom fit shape conforming substantially with the anatomical contours of a user's fingers for enhanced comfort and reduced fatigue during use of the computer mouse, said gel-like fluid retaining said custom fit shape for a substantial period of time following release of said use of the computer mouse.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved gel mouse which has all the advantages of the prior art mouse-like devices for generating commands to a computer and none of the disadvantages by creating an ergonomic mouse which is formed by a medium conforming to angular forces, varying weights, shapes, sizes and right-handed or left-handed orientations of a user.

It is another object of the present invention to provide a new and improved gel mouse which is soft and inviting when compared to conventional mouses which are hard and demand the user's hand to conform to its shape rather than the mouse adapting to the user's hand.

It is another object of the present invention to provide a new and improved gel mouse capable of adjusting itself upon pressure of a user's hand and distributing forces imparted to it via a user's hand while allowing the user's hand to be positioned where it is most comfortable.

It is a further object of the present invention to provide a new and improved gel mouse which is of a durable and reliable construction.

An even further object of the present invention is to provide a new and improved gel mouse which is susceptible of a low cost of manufacture with regard to both materials and labor, and which accordingly is then susceptible of low prices of sale to the consuming public, thereby making such a gel mouse economically available to the buying public.

Lastly, it is an object of the present invention to provide a mouse for use in association with a computer. The mouse comprises a housing having an upper surface, the upper surface including a primary chamber and buttons including chambers whereby all the chambers are covered with a resilient membrane for containing a quantity of gel-like fluid within the chambers and adapted to change shape of the housing membrane from an initial shape to a custom fit shape conforming substantially with the anatomical contours of a user's hand for enhanced comfort and reduced fatigue during use of the computer mouse, said gel-like fluid retaining said custom fit shape for a substantial period of time following release of said use of the computer mouse and thereafter returning substantially to said initial shape.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the mouse taken along line 3—3 of FIG. 1.

FIG. 4 is an enlarged portion of the mouse shown in the prior Figures taken at circle 4 of FIG. 3.

The same reference numerals refer to the same parts throughout the various Figures.

DESCRIPTION OF THE PREFERRED EMBODIMENT

Figure 1:
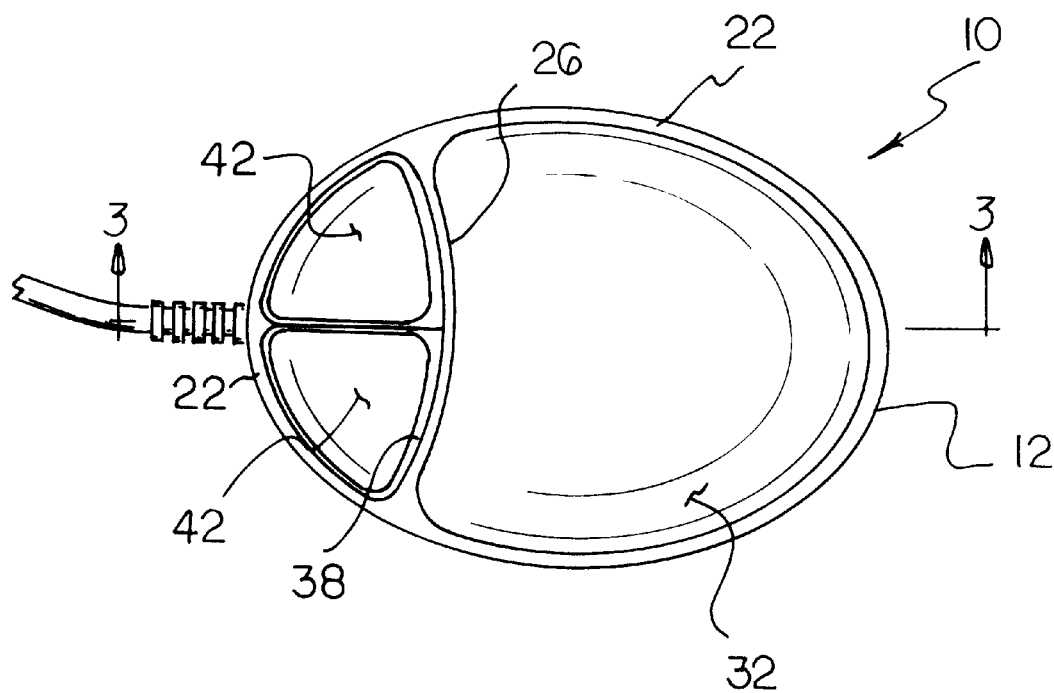
FIG. 1 is a top elevational view of the preferred embodiment of the new and improved gel mouse constructed in accordance with the principles of the present invention.
Figure 2:
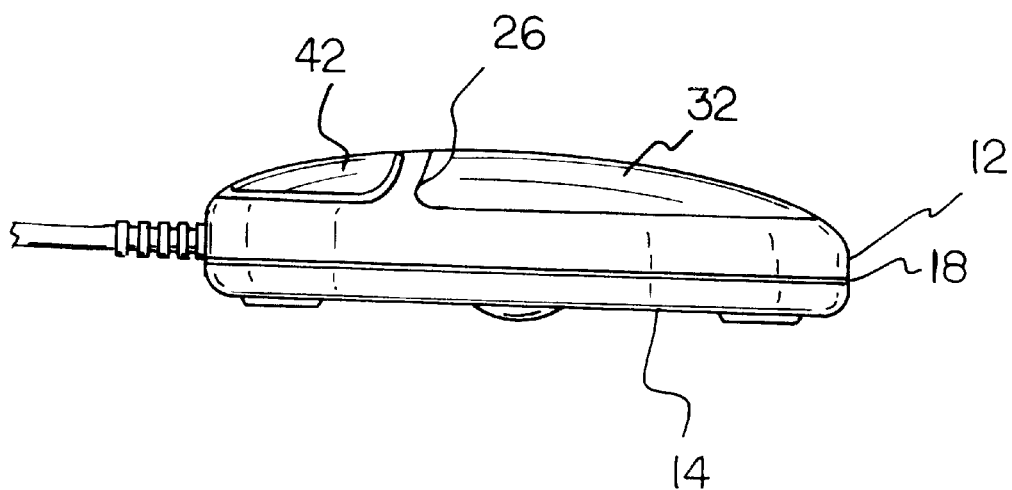
FIG. 2 is a side elevational view of the mouse shown in FIG. 1.

With reference now to the drawings, and in particular to FIGS. 1 through 4 thereof, the preferred embodiment of the new and improved gel mouse embodying the principles and concepts of the present invention and generally designated by the reference numeral 10 will be described.

The present invention is a new and improved gel mouse, 10. The central component of the mouse 10 of the present invention is a main housing 12. The main housing is fabricated of a rigid material, preferably plastic. It is fabricated to have a flat lower surface 14. Above the flat lower surface is a curved, generally spherical upper surface 16. Side walls 18 are formed between the upper and lower surfaces to maintain them in a spaced relationship. The side walls are located between the upper and lower surfaces and define a lower chamber 20 therewithin.

The housing also is fabricated to include a peripheral extension wall 22. Such extension wall extends upwardly from the periphery of the housing and constitutes an extension of the side walls 18. In addition, a supplemental extension wall 26 extends within and between the peripheral extension wall. The supplemental extension wall 26 is formed in curvilinear shaped configuration. Formed within the peripheral extension wall and supplemental extension wall is a large upper primary recessed cavity 28. In addition, a button receiving opening 30 is formed between the peripheral extension wall and the supplemental extension wall. The button receiving opening is positioned within the peripheral extension wall adjacent the upper primary recessed cavity and spaced therefrom by the supplemental extension wall. The peripheral extension wall and supplemental extension wall are preferably fabricated integrally with the main housing and of the same material.

Next provided in the system is a large membrane 32. Such large membrane has a periphery secured to the upper primary recessed cavity 28 at the upper regions of the peripheral extension wall and supplemental extension wall. As such, the large membrane forms the top surface of an upper primary chamber 34. The membrane, in the preferred embodiment, is fabricated of a deformable resilient elastomeric material.

At least one button 36 is positioned within the button receiving opening 30. Preferably, two symmetrical buttons 36 are positioned within the button receiving opening 30. Each button is formed to include a peripheral extension wall 38 to define a secondary recessed cavity 40. Such extension wall extends upwardly from the periphery and of the button constitutes an extension of the button. The button peripheral extension wall is preferably fabricated integrally with the button and of the same material.

Next provided is at least one button membrane 42. Preferably, there are provided a pair of button membranes 42. Such button membrane has a periphery secured to the secondary recessed cavity 40 at the upper regions of the button peripheral extension wall 38. As such, each button membrane forms the top surface of a secondary chamber 44. The membrane, in the preferred embodiment, is fabricated of a deformable resilient elastomeric material.

Next provided as part of the mouse is a quantity of a gel-like fluid 46. The gel is located within the primary and secondary chambers. The gel-like fluid within the primary chamber is adapted to change shape of the large membrane from an initial shape to a custom fit shape conforming substantially with the anatomical contours of a user's palm during use of the computer mouse. Further, the gel-like fluid within the secondary chambers is adapted to change shape of the button membrane from an initial shape to a custom fit shape conforming substantially with the anatomical contours of a user's fingers for enhanced comfort and reduced fatigue during use of the computer mouse. Further, the gel-like fluid retains the custom fit shape for a substantial period of time following release of said use of the computer mouse and thereafter returning substantially to the initial shape. To that extent, the fluid must fully fill, or essentially fully fill, each of the chambers individually.

In the preferred embodiment of the invention, the gel-like fluid is adapted to retain the deformed shape, whereby the mouse can be released and regripped by the same user without undergoing significant shape change. Preferably, the gel-like material has a relatively high degree of elasticity yet a relatively slow recovery time or speed of retraction upon deformation, such that the mouse will retain its deformed configuration after release for at least a substantial period of at least five seconds or more. After that period of time, the deformable mouse will slowly return substantially to its initial nondeformed shape and can be later regripped by a second user with appropriate reshaping to an alternate configuration.

The gel mouse is a computer mouse that has a putty-like substance over the body and keys of the mouse covered with a flexible material. The purpose of the gel mouse is to allow the mouse and keys to absorb shock and conform to the user's hand. In this way, a symmetrical mouse also becomes more readily adaptable to a right- or left-handed user. Further, the gel mouse is fun to play with.

In the preferred embodiment, the putty-like material is a silicone-based substance produced by Dow Corning under the name Sylgard 527. Another substance with similar properties is Silly Putty. Ideally, the putty material when encapsulated by the flexible material will deform under load and return back to its original shape when pressure is removed. Ideally, the flexible material covering the putty is stretchable. In the preferred embodiment the flexible material is latex which is abrasion resistant and very flexible.

Next provided is a small aperture 48 in one of the side walls for the passage of electrical wires. Such electrical wires include associated individual electrical wires extending separately to the buttons. In this manner, the depression of the buttons will create the conventional electrical charge to the computer in the conventional manner.

Last provided in the mouse of the present invention is a large circular hole 50 in the center of the lower surface of the housing. In association therewith, an associated ball 52 is provided within the lower chamber. The ball has a diameter greater than the diameter of the large hole. In this manner, the ball within the chamber will have a portion thereof extending downwardly and exterior of the mouse. This allows rotation of the ball upon movement of the housing by the user. Appropriate electrical couplings extend from the ball, through the hole to exterior of the device and the housing in the conventional manner.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved gel mouse for use in association with a computer comprising, in combination:

a unitary main housing fabricated of a rigid plastic material and having a flat lower surface and a generally spherical upper surface with side walls therebetween to define a lower chamber therewithin, the housing including a peripheral extension wall extending upwardly from the periphery of the housing as an extension of the side walls and a supplemental extension wall within the peripheral extension wall and forming a large upper primary recessed cavity and a button receiving opening;

a large membrane having a periphery secured to the upper regions of the peripheral extension wall and supplemental extension wall and forming the top surface of an upper primary chamber;

a quantity of gel-like fluid within the primary chamber and adapted to change shape of the large membrane from an initial shape to a custom fit shape conforming substantially with the anatomical contours of a user's palm for enhanced comfort and reduced fatigue during use of the computer mouse, said gel-like fluid retaining said custom fit shape for a substantial period of time following release of said use of the computer mouse and thereafter returning substantially to said initial shape;

a pair of buttons positioned within the button receiving opening, each button including an upwardly extending peripheral extension wall to define a secondary recessed cavity;

a pair of button membranes, each button membrane having a periphery secured to the upper regions of a corresponding button peripheral extension wall and forming the top surfaces of a pair of secondary chambers; and a quantity of gel-like fluid within the secondary chamber and adapted to change shape of the button membranes from an initial shape to a custom fit shape conforming substantially with the anatomical contours of a user's fingers for enhanced comfort and reduced fatigue during use of the computer mouse, said gel-like fluid retaining said custom fit shape for a substantial period of time following release of said use of the computer mouse.

2. The mouse as set forth in claim 1 and further including: a large circular hole in the center of the lower surface of the housing with an associated ball having a diameter greater than the diameter of the large hole whereby a ball within the lower chamber will have a portion thereof extending downwardly and exterior thereof for rotation upon movement of the housing.

3. A computer mouse comprising:

a housing having an upper surface, the upper surface including a primary recessed cavity;

a housing membrane covering the primary recessed cavity and forming a primary chamber;

a quantity of gel-like fluid within the primary chamber and adapted to change shape of the housing membrane from an initial shape to a custom fit shape conforming substantially with the anatomical contours of a user's palm for enhanced comfort and reduced fatigue during use of the computer mouse, said gel-like fluid retaining said custom fit shape for a substantial period of time following release of said use of the computer mouse and thereafter returning substantially to said initial shape;

wherein the upper surface includes at least one button, the button including a secondary recessed cavity;

a button membrane covering the secondary recessed cavity and forming a secondary chamber; and a quantity of gel-like fluid within the secondary chamber and adapted to change shape of the button membrane from an initial shape to a custom fit shape conforming substantially with the anatomical contours of a user's fingers for enhanced comfort and reduced fatigue during use of the computer mouse, said gel-like fluid retaining said custom fit shape for a substantial period of time following release of said use of the computer mouse.

* * * * *